G. W. CHANCE.
HARBOR IMPROVEMENT APPARATUS.
APPLICATION FILED OCT. 29, 1921.
1,432,530.   Patented Oct. 17, 1922.
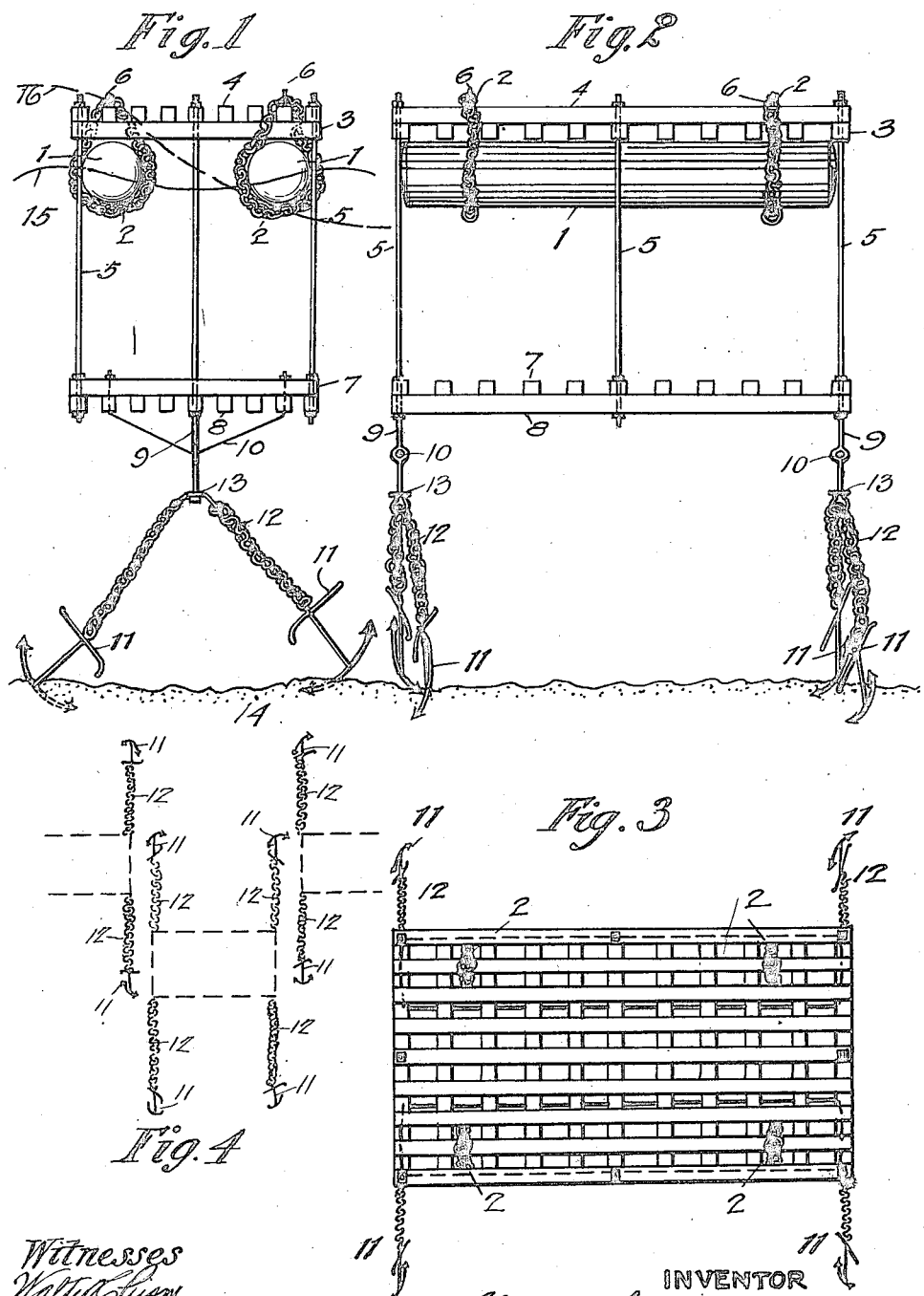

Patented Oct. 17, 1922.

1,432,530

UNITED STATES PATENT OFFICE.

GEORGE WHITEFIELD CHANCE, OF SWARTHMORE, PENNSYLVANIA.

HARBOR-IMPROVEMENT APPARATUS.

Application filed October 29, 1921. Serial No. 511,521.

*To all whom it may concern:*

Be it known that I, GEORGE WHITEFIELD CHANCE, a citizen of the United States, residing at Swarthmore, in the county of Delaware and State of Pennsylvania, have invented a new and useful Harbor-Improvement Apparatus, of which the following is a specification.

My invention relates especially to harbor improvement.

Where the water is sufficiently deep for cargo vessel navigation, in an open roadstead, exposed to the action of the wind, the waves greatly interfere with the lighterage or unloading of the merchandise or passengers of such vessels. My device is intended to mitigate the action of the waves, lowering their height and spreading them. By such device, the top part of the wave is caught, perforated and flattened out.

The device consists in two platforms, preferably constructed of wood, and with apertures therein, connected, vertically with rods, the upper platform having attached, thereto, air tight cylinders. The whole structure being so arranged that when immersed in water, the upper plane or platform remains above the same.

I attain the object stated by the construction shown in the accompanying drawing in which—

Figure 1, is an end view of the apparatus shown floating in water; Figure 2 is a side view:—

Figure 3 a plan and Figure 4 shows an outline plan view of staggered positions of such devices, best suited, in most instances to break up wave crests about parallel to the long axes of the device.

Similar numbers refer to similar parts throughout the drawing.

1, 1 show floatation cylinders, attached to a wooden grilled platform by chains 2, 2, with ends fastened together to bolts 6, 6.

3, 3 show cross timbers fastened to the underside of longitudinal timbers 4, 4 and 5, 5 vertical rods connecting the upper grille shown with the lower grille, composed of cross timbers 7, 7 connected to longitudinals 8, 8.

There is a rod 9, near each end of the device extending below the lower platform, with an eye in the same through which a brace 10 runs. This rod has a collar 13, on it, to which anchor chains 12, 12—are attached, said collar sliding up and down, with the rise and fall of the apparatus relative to the bottom 14. 11, 11,—show anchors to hold the device in place.

The water tight cylinders 1, 1, keep the upper grille platform above the waves and the under grille retards the sudden uplift of the waves, checking the vertical motion of the whole apparatus and flattening out the crests of the waves, 16, to 15. The exact arrangement of such apparatus relative to the general crest position must vary in different localities.

Generally speaking, the long axis of the structure would be placed somewhat in the same direction as the axis of the average wave crest.

The construction may be staggered in line, preferably as shown by Figure 4, to break up the general line of wave crests and flatten them out effectually.

I claim as follows:—

1. A combination, consisting of two grilled planes placed at an adjustable distance apart connected by rods, the upper plane having attached thereto means for assisting flotation when immersed in water.

2. A combination consisting of two grilled nearly parallel planes in flotation, moorings attached to the same, with means to allow for a vertical upward and downward flotation, such motion being between the opposite moorings in each case.

GEORGE WHITEFIELD CHANCE.

Witnesses:
A. I. DONAHUE,
M. H. QUINN.